United States Patent [19]

Shriver et al.

[11] 4,215,527
[45] Aug. 5, 1980

[54] MULTI-ROW CROP HEADER WITH FEED ASSIST ROLLER

[75] Inventors: Joe E. Shriver, East Earl; Curtis H. Lindblom, New Holland, both of Pa.

[73] Assignee: Sperry Rand Corporation, New Holland, Pa.

[21] Appl. No.: 8,143

[22] Filed: Jan. 31, 1979

[51] Int. Cl.² .............................................. A01D 45/02
[52] U.S. Cl. ..................................................... 56/98
[58] Field of Search ................................ 56/13.9–14.6, 56/51–119

[56] References Cited

U.S. PATENT DOCUMENTS

| | | | |
|---|---|---|---|
| 3,388,538 | 6/1968 | Markham | 56/98 |
| 3,791,117 | 2/1974 | Lawrence | 56/98 |
| 3,803,820 | 4/1974 | Knapp | 56/98 |
| 4,048,792 | 9/1977 | Shriver et al. | 56/98 |
| 4,115,983 | 9/1978 | Barnes et al. | 56/98 |

*Primary Examiner*—Russell R. Kinsey
*Attorney, Agent, or Firm*—C. Hercus Just; Frank A. Seemar; John B. Mitchell

[57] ABSTRACT

A multi-row crop header for a forage harvester having a plurality of forwardly extending dividers to provide crop passageways therebetween, the inner ends of said dividers being adjustably connected to a transverse frame member to vary the spacings between said passageways, and a rotatable feed assist roller mounted adjacent the inner end of the outermost divider to assist in guidng down crops picked up by said dividers to the inner ends of said passageways for discharge therefrom and prevent hairpinning of said down crops from jamming said header thereby.

5 Claims, 3 Drawing Figures

MULTI-ROW CROP HEADER WITH FEED ASSIST ROLLER

BACKGROUND OF THE INVENTION

1. Field of the Invention

The present invention relates to a multi-row crop header attachable to a forage harvester and, more particularly, it is directed to an improvement in such crop headers to enable the same to be used in harvesting down and tangled row crops, such as corn which is sometimes blown down by windstorms and the like and is sometimes difficult to harvest with conventional forage harvesters.

2. Description of the Prior Art

Headers for forage harvesters adapted to handle down and tangled row crops have been devised heretofore. These have been developed to assist particularly in the harvesting of corn where some of the corn stalks are down and bent over, extending across and entangled with stalks of an adjacent row, for example. The forwardly extending dividers of crop headers, such as those similar to corn harvesters, move between the rows and the stalks of corn which are down become draped over and along the dividers as the stalks are conveyed rearwardly along the passageways between such dividers as the stalks are positively engaged by gathering chains which have longitudinal segments thereof extending respectively along opposite sides of the passageways, said chains gripping the lower portions of the stalks after they have been cut by a cutting disk or the like, at the forward end of each passageway and the lower portions of said stalks are fed into a harvester, butt end first. When the dividers encounter down or draped-over stalks, said stalks tend to wrap around the dividers and bunch up, particularly adjacent the rear ends of the passageways of the outermost dividers which results in jamming, thereby requiring greater amounts of power than ordinarily to overcome such jamming, as well as producing an uneven feeding of the stalks to the harvester. It is not uncommon that an appreciable amount of a crop of this type is lost or damaged, as well as producing unnecessary wear upon the harvesting equipment.

One of the principal difficulties occurring in the harvesting of down and tangled crops comprises the handling of draped stalks, such as corn stalks, extending across and downward from the aforementioned dividers into configurations which is sometimes referred to as "hairpinning". In particular, the difficulty is accentuated when stalks extend in hairpin fashion across the outermost divider in a multi-row crop header because one end of such stalk engages the sides of the housing of the header and becomes bound and tangled adjacent the same. One expedient for handling this type of problem is to provide rotatable rollers, especially in the vicinity of the outer end of the frame of a header for purposes of engaging the hairpin stalks and tending to feed them toward the discharge area of the header and normally into a harvester of some type, especially those including feed rolls for forcefully feeding the crop material to a cutting and chopping head of various types. A typical example of a prior device in which rollers of the aforementioned type are employed is shown in U.S. Pat. No. 4,048,792, to Shriver, dated Sept. 20, 1977, the roller being associated with dividers that are not adjustable laterally as to spacing between adjacent pairs of dividers for purposes of adapting same to different row spacings of crops.

Additional patents which have attempted to alleviate the above-described difficulty comprise U.S. Pat. No. 3,338,538 to Markham, dated June 18, 1968, and U.S. Pat. No. 3,791,117 to Lawrence, dated Feb. 12, 1974. In both of these patents, however, the feed assist rollers, which are not movable in concert with the outer divider, are mounted substantially vertically and extend through the upwardly and rearwardly extending inclined shield surfaces of the outermost divider, thereby producing situations where pinching of the crop material between the edges of the openings in the shields and the ribs on the rollers can occur.

Still another patent having the same difficulty as the two patents set forth immediately above comprises U.S. Pat. No. 3,803,820 to Knapp, dated Apr. 16, 1974, in which a ribbed feed assist roller extends downwardly through an opening in the shield of the outermost dividers of a row crop harvester, thus providing such possibilities of pinching crop stalks between the edges of the openings and the ribs of the rollers.

The present invention, while utilizing rotatably-mounted feed assist rollers to overcome the difficulties previously encountered with hairpinning of stalks, nevertheless, obviates any pinching of crop material incident to utilizing such rollers and also includes other distinct advantages set forth in detail hereinafter.

SUMMARY OF THE INVENTION

The present invention is particularly adapted to a multi-row crop header for use with a forage harvester and in which header a plurality of forwardly extending dividers have rearward ends transversely adjustable upon a supporting frame member so as to adapt the header to harvest row crops of any particular spacing within a limited range of different spacings and in order to utilize feed assist rollers in such adjustable type of dividers, it is the principal object of the present invention to mount one such rotatable feed assist roller adjacent the inner end of the outermost divider for rotation about an upwardly and rearwardly extending axis and merge the lower ends of such roller curve-like with the upwardly and rearwardly sloping shield surfaces on said outermost dividers, thereby eliminating any possibility of pinching between said rollers and shield surfaces, as well as always having said rollers revolve about an axis fixed with respect to said outermost divider, regardless of the position to which said dividers have been adjusted with respect to the frame of the header.

Another object of the invention is to provide said feed assist roller with a concave bell shape on the lower and forward end so as to merge with the shield surfaces at the inner ends of the dividers with which said rollers are associated and the upper and rearward portion of the rollers being substantially cylindrical.

A further object of the invention is to provide a multi-row crop header with feed assist roller means of the type referred to hereinabove in association with a transversely extending converging or consolidating auger which extends across the full width of the header and thereby adapt the auger to coact with crop material delivered from the passageways defined by the dividers, said auger being contained within a housing having a longitudinally extending inlet opening in the forward and top faces thereof adjacent the transverse frame member upon which the inner ends of the dividers are adjustably mounted and said auger having reversely spiral portions converging in the center to consolidate the material for discharge through an exit opening leading to feed rollers or other types of mechanisms common in harvesting devices.

Still another object of the invention is to drive the feed assist roller in direct association with the chains extending along opposite sides of the adjacent passageway and thereby more closely match the surface speed of the roller to that of the ground speed and the material sliding over and along the surfaces of the shields of said dividers.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figures 1, 3:
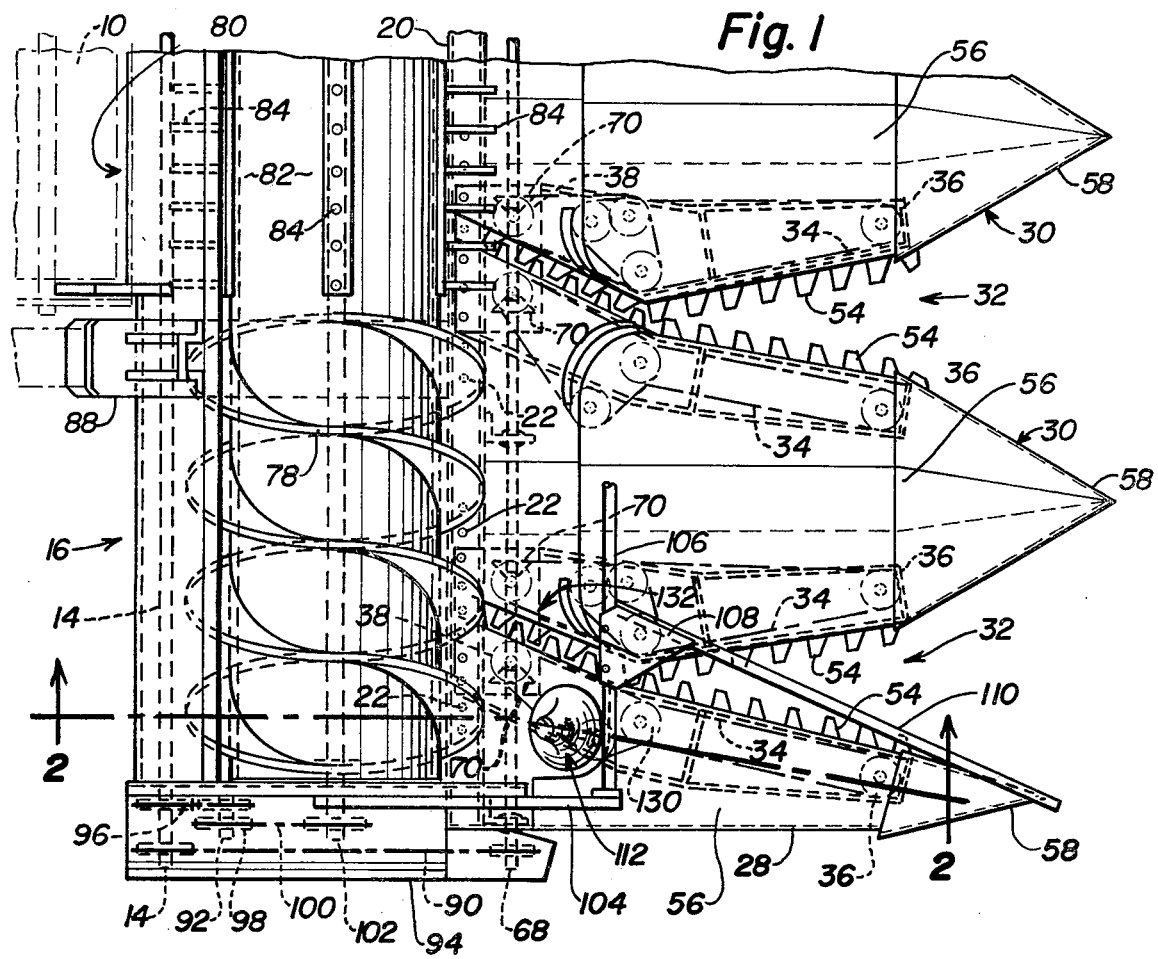
FIG. 1 is a fragmentary plan view of one end of an exemplary multi-row crop header showing the feed assist roller mounted relative to the outermost divider at said one end of said header.
FIG. 3 is a side elevation of the header shown in FIGS. 1 and 2, but on a smaller scale than employed therein and illustrating in exemplary manner the handling of down crops by said header and the feed assist roller thereon.

The present invention essentially comprises a substantial improvement over the row crop harvesting header comprising the subject matter of prior U.S. Pat. No. 4,048,792 and assigned to the assignee of the present invention. Said header is attachable to the forward end of a crop harvester, such as one including a pair of feed rolls 10, which are shown in phantom in FIGS. 1 and 2. Said harvester may be either the self-propelled type or one which is attached to a tractor or otherwise. Also, the power to drive the header of the present invention is derived from suitable means on the harvester which embodies the feed rolls 10, said power being exemplified by a drive chain 12, shown fragmentarily in phantom in FIG. 2, for purposes of operating a drive shaft 14 extending horizontally along the rearward end of the crop header 16, which embodies the present invention. Said shaft extends for the full width of the header of which only one end portion is shown in plan view in FIG. 1, for example. Said header comprises a base frame 18, details of which are best shown in FIG. 2, one of the more important features of said frame comprising a transversely extending support structural member 20, which extends continuously between opposite ends of the crop header and includes in the upper wall thereof, groups of a plurality of evenly-spaced holes 22 through which bolts 24 extend, see FIG. 2, for purposes of attaching thereto sub-frame members 26, also shown in FIG. 2, that comprise the basic support means for the respective dividers of the crop header 10.

Referring to FIG. 1, it will be seen that the crop header 16 is provided at one end with a single divider 28, it being understood that the opposite end of the header will have a similar single divider. Intermediately, however, between said endmost dividers are compound dividers 30, respective sides of which cooperate, for example, with the endmost divider 28 and the adjacent side of the next compound divider 30, as readily can be seen from FIG. 1, for purposes of defining between said dividers, crop passageways 32.

Figure 2:
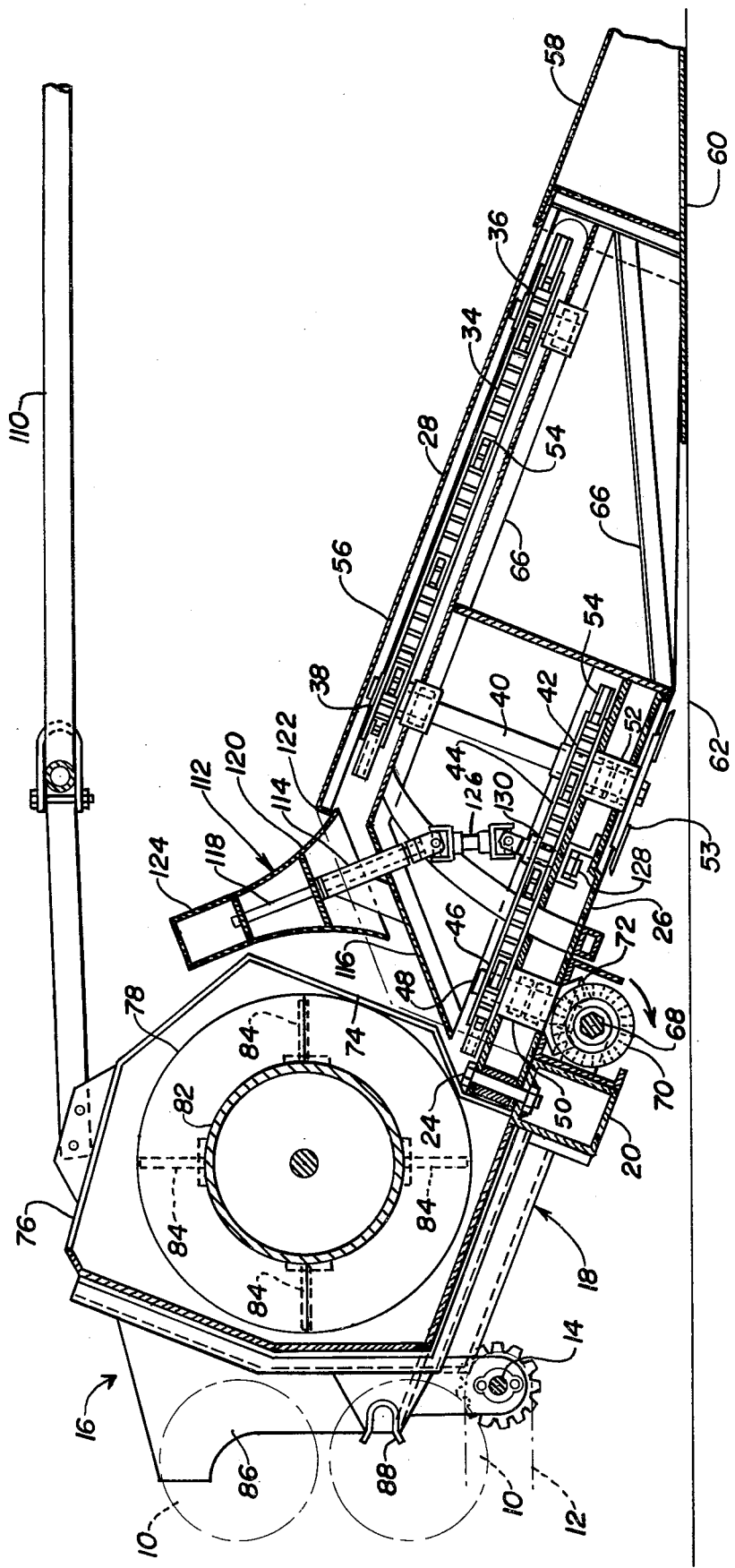
FIG. 2 is a partially fragmentary vertical side elevation of the header shown in FIG. 1, as seen on the line 2—2 thereof.

Adjacent each side of the dividers 28 and 30, is an upper endless gathering chain 34, shown in side view in FIG. 2, said chain extending around at least one idler sprocket 36 and a drive sprocket 38. Said drive sprockets are attached to the upper ends of drive shafts 40, see FIG. 2, which, on the lower ends thereof, have an additional driven sprocket 42 around which an endless lower gathering chain 44 extends, the same also extending around another drive sprocket 46, which is mounted on the upper end of a short driven shaft 48, supported in a suitable bearing 50 which is fixed to sub-frame member 26. Another bearing 52 also is supported by said sub-frame member 26 in order to support the lower end of the drive shaft 40 therein. There is such a drive shaft for each of the upper and lower gathering chains 34 and 44 and said lower ends also support rotary crop cutters 53. It also will be understood that the endless gathering chains 34 which are mounted at a level above the lower gathering chains 44 all have spaced fingers 54 thereon for effectively engaging stalk crops and the like to positively feed the same into the inner ends of the passageways 32 after the same have been severed by the cooperating cutter means 53 respectively on the pairs of shafts 40 adjacent the inner end of the passageways 32.

The outer dividers 28 and the intermediate compound dividers 30 are provided with conventional shrouds or shields 56 which extend rearwardly and upwardly, terminating at the forward ends in points 58, the lower forward portions of the shrouds or shields 56 comprising skid shoes 60, see FIG. 2, which slide along the ground surface 62 and thereby effectively slide beneath fallen and tangled crops, such as the exemplified stalks 64, shown best in FIG. 3. Said shrouds or shields, as well as the skid shoes, are all supported by additional sub-frame means 66 attached to and supported by the sub-frame members 26.

The crop header 16 is also provided with a horizontally extending main drive shaft 68 which, as best shown in FIG. 2, in cross-section, is of a geometrical configuration, such as a hexagon, upon which a plurality of bevel gears 70 are mounted, said bevel gears meshing with additional mating bevel gears 72, which are best shown in FIG. 2 on a larger scale than those illustrated in FIG. 1. Said mating bevel gears are fixed to the lower ends of the short driven shafts 48, whereby it will be seen that as the main drive shaft 68 is rotated in the direction of the exemplary arrow shown in FIG. 2, the upper and lower gathering chains 34 and 44 will be movable respectively on opposite sides of the passageways 32 to positively move crop material into said passageways to the inner ends thereof where the same passes through the open forward portion 74 and the open top portion 76 of the auger housing in which the auger 78 is rotatably mounted.

The auger housing has a central discharge opening 80, shown near the upper part of FIG. 1. From said figure, it also will be seen that the auger has a spiral flight at one end which, as the auger is rotated in the desired direction, serves to consolidate and compact the cut crop material which is delivered from the passageways 32 to said auger and moves the material toward the central part of the auger housing, which is illustrated in the upper portion of FIG. 1, where it will be seen that the base tube 82 of the auger is provided with a plurality of rows of short radial fingers 84 which positively move the consolidated material through the discharge opening 80 into the exemplary feed rolls 10 of a harvester. As also shown in FIG. 2, the header housing has rearwardly extending connecting means 86 and 88 which engage and cooperate with suitable support means on the harvester.

Referring to FIGS. 2 and 3, in particular, the drive means for the row crop header of the present invention is driven primarily by the drive shaft 14, which is connected to the main drive shaft 68 by a chain 90. A jack shaft 92 extends horizontally within the gear housing 94 at one end of the auger housing and said shaft is driven by a chain 96 which extends upward from a sprocket gear on drive shaft 14. Another sprocket gear 98 on jack shaft 92 drives chain 100 which extends around another sprocket gear affixed to auger shaft 102.

For purposes of facilitating the guiding of crops into the passageways 32, the header is also provided with horizontal arms 104 respectively at opposite ends of the header housing, the outer ends of which support a horizontal bar 106. Said bar supports adjacent opposite ends thereof a pair of brackets 108, only one of which is shown in FIG. 1, for purposes of supporting a forwardly and outwardly extending guide rod 110, which operates to direct standing crop material toward the outermost passageways 32 of said header.

The principal feature of the present invention comprises a feed assist roller 112, details of which are best shown in FIG. 2. An elongated bearing 114 is suitably supported by another sub-frame member 116, which is fixedly connected to and supported by the sub-frame member 26 of the outermost divider 28. The bearing 114 supports a shaft 118 to which the bell-shaped shell 120 of the feed assist roller 112 is attached. From FIGS. 2 and 3, it will be seen that the bell shape is concave so as to flare outwardly and in downward direction and thereby provide an outer surface on the roller which merges very closely with the upper inner end 122 of the shroud or shield 56 of said outermost divider 28, whereby no trapping or pinching of crop material can occur between the roller and shroud as is possible in certain of the prior structures referred to hereinabove. The upper portion 124 of the roller 112 preferably is substantially cylindrical and closed at the top. Further, it will be seen from FIG. 2 that the axis of the roller 112 extends upwardly and rearwardly and said roller is driven by means of shaft 118 being connected by a universal joint to one end of the connecting shaft 126, the opposite end of which has another universal joint thereon that connects the same to a short driven shaft 128 upon which a sprocket gear 130 is connected, which is shown in phantom in FIG. 1, and is also shown in FIG. 2 for engagement with the lower gathering chain 44 by which it is directly driven for rotation of the feed assist roller 112 in a direction to move crop material 64 to the inner end 132 for engagement by the auger 78.

Of substantial importance is the fact that unlike prior devices in which feed assist rollers have been employed, the present invention is directed to supporting the feed assist roller 112 directly by the sub-frame 26 and its connecting parts, which is longitudinally adjustable along the transverse support member 20 of the base frame 18 by means of disposing the inner end of sub-frame member 26 adjacent a selected hole 22 in support member 20 through which the bolt 24 is inserted commonly with a corresponding hole in the inner end of sub-frame member 26 and thereby arrange the inner end of the outermost passageway 32, as well as the inner ends of the intermediate passageways 32, in desired transverse spaced relationship according to the spacing of the rows of the crops being harvested by the header. Accordingly, in addition to feed assist rollers in the prior devices offering possibilities of pinching crop material between the rollers and the adjacent shields, said rollers revolve about shafts which are fixed stationarily with respect to the corresponding supporting frame structure and no adjustability for accommodating different spacing of crop material is present. In contrast, any desired positioning of the inner end of the outermost divider 28 in the present invention, automatically carries with it the feed assist roller 112 for movement about an axis fixed with respect to said inner end of said outermost divider.

In view of the foregoing, as readily can be visualized from FIG. 3, fallen and tangled crop material, especially tangled stalk crop material, can be engaged from beneath by the endmost dividers 28 and intermediate compound dividers 30, said end dividers 28 particularly raising said crop material, which slides upwardly and inwardly along the outer surface of shroud or shield 56, and even if the stalks extend over the divider in hairpin fashion, when the same engage the feed assist roller 112, which rotates inwardly toward the outermost passageway 32, said crop material is moved by said roller into the inlet opening of the auger housing for engagement thereby.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A multi-row crop header having a transversely extending converging auger and adapted to be mounted on a forage harvester for support and operation thereof and comprising in combination, a frame including a transverse support member adjacent said auger, means on said frame to connect it to the forward portion of a forage harvester, a plurality of forwardly extending dividers projecting forwardly from said auger and defining crop passageways extending therebetween and upwardly and rearwardly inclined surfaces to slidably engage down crops as said header advances, pairs of endless cooperating feeding and gathering chains supported by said frame and having substantially parallel segments respectively disposed along opposite sides of each of said passageways, crop cutters adjacent each passageway and supported by said frame, means adjustably connecting the innermost ends of said dividers to said transverse support member of said frame to permit said dividers to be adjusted transversely relative to each other to adapt the same to harvest row crops in which the rows are evenly spaced different distances from other rows of crops, and means to connect said cutters and chains commonly to power means on said forage harvester for operation thereof in association with said converging auger to receive cut row crops from said passageways between said dividers and consolidate the same; the improvement consisting of rotary feed assist means comprising an elongated roller mounted adjacent the inner end of the outermost divider for rotation about an axis fixed relative to said inner end of the outermost divider and having surfaces merging generally with the contours of said divider and extending generally upwardly and rearwardly therefrom to engage and guide down crops from the inner end of said outermost divider to said auger for said consolidation of said cut crop material, and means connected to said roller and driven relative to said chains to rotate said roller toward said passageway to move said down crops into said auger and thereby prevent hairpinning of said down crops.

2. The multi-row crop header according to claim 1 in which said elongated roller has a bell-like lower and forward end generally merging with the inner end portion of said upwardly and rearwardly inclined surface of said outermost divider to prevent pinching of crop material therebetween and the upper and rearward end of said roller being substantially cylindrical.

3. The multi-row crop header according to claim 2 in which the fixed axis of rotation of said roller is inclined upwardly and rearwardly from the inner end of said outermost divider.

4. The multi-row crop header according to claim 1 in which the powered drive means for said chains are connected to said roller to more closely match the surface speed of said roller to that of the ground speed and the material sliding over and along the surfaces of said dividers.

5. The multi-row crop header according to claim 1 in which said auger extends substantially between opposite sides of said header and is rotatable about a horizontal axis substantially parallel to and rearward of said transverse support member, said auger being mounted in a housing having a forward inlet opening coextensive with said inner ends of all of said crop passageways, and said housing having a central rearward discharge opening of less width than said inlet opening.

* * * * *